United States Patent [19]

Woodmansee

[11] 4,150,953

[45] Apr. 24, 1979

[54] COAL GASIFICATION POWER PLANT AND PROCESS

[75] Inventor: Donald E. Woodmansee, Schenectady, N.Y.

[73] Assignee: General Electric Company, Schenectady, N.Y.

[21] Appl. No.: 908,540

[22] Filed: May 22, 1978

[51] Int. Cl.² ............................................... C10K 1/08
[52] U.S. Cl. .......................................... 48/71; 48/75; 48/77; 48/197 R; 48/200; 55/73; 60/39.12; 261/16; 261/30; 261/98
[58] Field of Search ..................... 48/77, 76, 71, 62 R, 48/75, 63, 197 R, 200, 202, 206, 210, 215; 60/39.12, 39.07, 39.02; 261/16, 30, 98; 55/73, 84

[56] References Cited

U.S. PATENT DOCUMENTS

| 3,787,559 | 1/1974 | Rudolph et al. | 55/73 |
|---|---|---|---|
| 4,074,981 | 2/1978 | Slater | 48/206 |
| 4,092,825 | 6/1978 | Egan | 60/39.12 |
| 4,101,294 | 7/1978 | Kimura | 48/77 |

OTHER PUBLICATIONS

Kydd, "Integrated Gasification Gas Turbine", Chemical Engineering Progress, Vol. 71, No. 10, pp. 62-68 (Oct. 1975).
Woodmansee et al., "Gasification of a Highly Coking Coal in the GEGAS Pressurized Gas Producer", American Chemical Society Fuels Div. Prepoint, 22, 1, pp. 158-172.

Primary Examiner—S. Leon Bashore
Assistant Examiner—George C. Yeung
Attorney, Agent, or Firm—Richard G. Jackson; Joseph T. Cohen; Leo I. MaLossi

[57] ABSTRACT

In an integrated coal gasification power plant, a humidifier is provided for transferring as vapor, from the aqueous blowdown liquid into relatively dry air, both (I) at least a portion of the water contained in the aqueous liquid and (II) at least a portion of the volatile hydrocarbons therein. The resulting humidified air is advantageously employed as at least a portion of the hot air and water vapor included in the blast gas supplied via a boost compressor to the gasifier.

12 Claims, 1 Drawing Figure

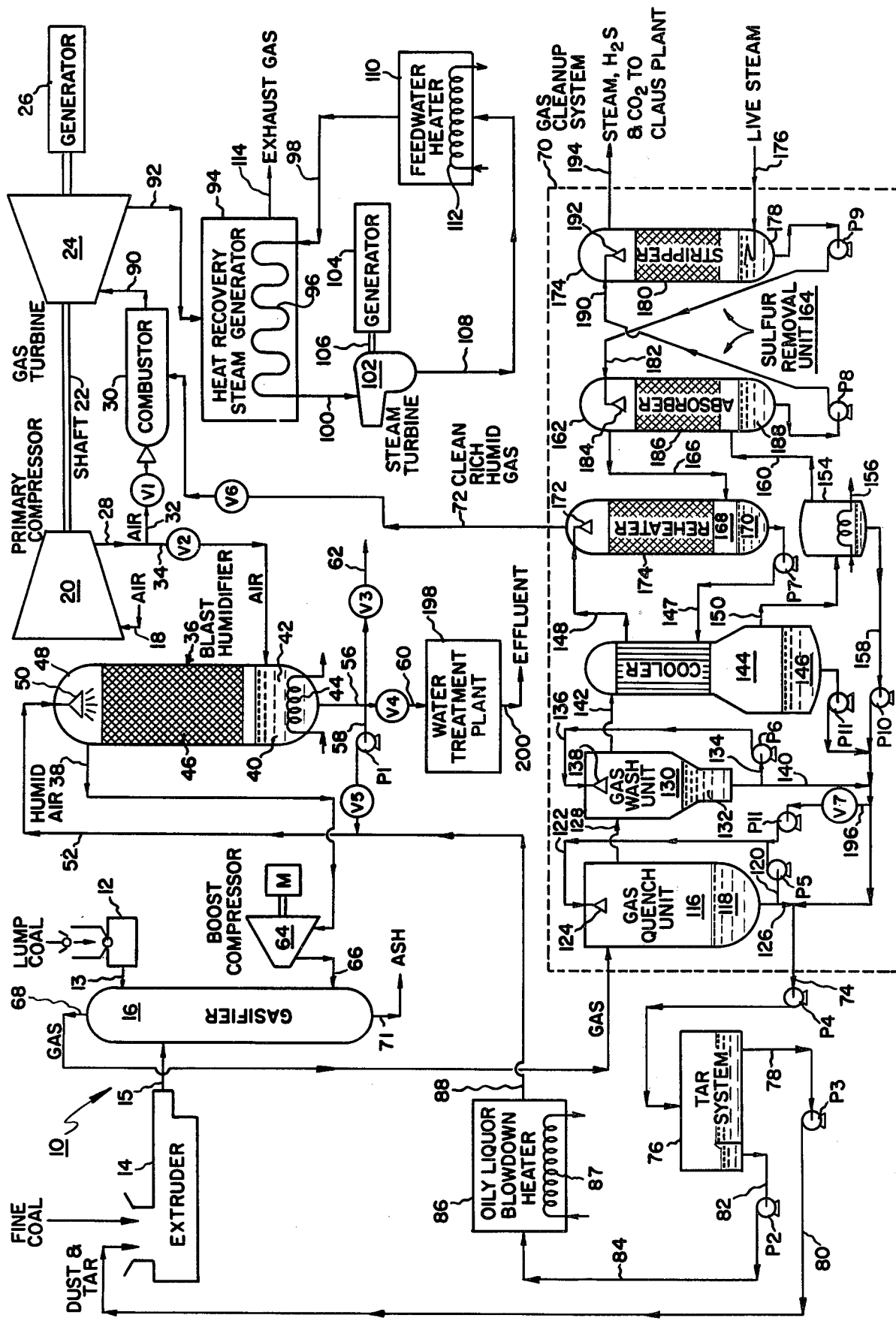

COAL GASIFICATION POWER PLANT AND PROCESS

The invention described herein was made in the course of, or under, a contract with the Energy Research and Development Administration.

BACKGROUND OF THE INVENTION

The present invention relates to a new improved integrated coal gasification power plant and to a new, improved process useful for operation thereof.

Integrated coal gasification power plants are well known. Included in one type of such plants are a coal gasifier for producing a raw gaseous fuel by pressure gasification of coal with pressurized air and water vapor and means, e.g., a boost compressor, for both pressurizing hot air and water vapor and supplying the pressurized air and water vapor to the gasifier as blast gas therefor. The plant further includes a gas clean-up system adapted to (I) remove from the raw gaseous fuel at least a portion of any contaminants present therein and (II) produce both (i) an aqueous blowdown liquid containing volatile hydrocarbons and (ii) a cleaned-up gaseous fuel. A combustor is provided for combustion of the cleaned-up gaseous fuel to produce a hot expansible gaseous combustion product. Means, e.g., a primary compressor, are included for pressurized air and for supplying the pressurized air to the combustor. An assembly including a gas turbine and an electric generator coupled thereto is operated by expansion of the combustion product through the gas turbine for generating electric power.

A plant generally of the foregoing type is described by Kimura in U.S. patent application Ser. No. 824,335, filed Aug. 15, 1977, now U.S. Pat. No. 4,101,294, assigned to the assignee hereof and incorporated herein by reference. The referenced Kimura application describes an improved apparatus and process employing a microporous barrier in reheating and resaturating with water vapor a clean fuel gas by means of a hot liquid stream containing water.

For further background, the reader is referred to U.S. Pat. No. 3,787,559 (Rudolph et al.), which describes reheating and resaturating allegedly clean gas derived from pressure distillation of coal with air and steam.

It would be advantageous to have a process and apparatus for recovering hydrocarbons and water from the aqueous blowdown liquid in the above-described plant, wherein the recovered water would constitute at least a portion of the water vapor supplied in the blast gas to the gasifier and the recovered hydrocarbons would be recycled to the plant. The recovered hydrocarbons would be converted in the combustor to innocuous entities, e.g., water and carbon dioxide, with subsequent utilization of the resulting additional heat of combustion in operating the gas turbine/electrical generator assembly.

It has been found by practice of the present invention that such advantageous apparatus and process are provided, whereby the efficiency of the integrated plant will be substantially increased.

DESCRIPTION OF THE INVENTION

Generally stated, the present invention provides, in one aspect thereof, an improved integrated coal gasification power plant. Thus, this invetion provides, in a power plant of the above-described type, an improvement comprising means for transferring as vapor, from the aqueous blowdown liquid into relatively dry air, both (I) at least a portion of the water contained in the aqueous liquid and (II) at least a portion of the volatile hydrocarbons therein. (The relatively dry air may be supplied from any suitable source, preferably the primary compressor.) The resulting humidified air is advantageously employed as at least a portion of the hot air and water vapor supplied to the boost compressor and as at least a portion of the blast gas supplied to the gasifier. Thus, the recovered water and volatile hydrocarbon components are advantageously included in the blast gas and ultimately in the cleaned-up gas supplied to the combustor.

Generally stated, in another aspect, this invention provides an improvement in the process for operating the above-described power plant. In the process, the improvement includes the step of performing the function of the aforementioned transfer means.

BRIEF DESCRIPTION OF THE DRAWING

Practice of the present invention will be more fully understood by having reference to the following detailed description taken with the accompanying drawing, which schematically illustrates the present invention and the best mode contemplated for carrying it out.

The drawing schematically illustrates an improved integrated coal gasification power plant and a process for the operation thereof in accordance with preferred embodiments of this invention.

DETAILED DESCRIPTION OF THE INVENTION AND MANNER AND PROCESS OF MAKING AND USING IT

Referring to the drawing, there is shown integrated coal gasification power plant 10, which includes as a principal component thereof gasifier 16 for producing a raw gaseous fuel by pressure gasification of coal or other suitable solid carbonaceous fuel with pressurized air and water vapor. Other principal components, the function and interrelationship thereof being described hereinbelow, include primary compressor 20, blast humidifier 36, boost compressor 64, gas clean-up system 70, combustor 30, gas turbine 24 and electrical generator 26 coupled operatively thereto.

Turning now in greater detail to the foregoing and other principal components subsequently described, coal is introduced generally at the top of gasifier 16 in any suitable manner. For example, lump coal may be introduced via feeder 12 through inlet line 13 and fine coal may be introduced via extruder 14 and inlet line 15. Introduction of fine coal in admixture with dust and/or tar via an extruder is described in Furman, U.S. Pat. Nos. 4,049,390 and 4,049,392.

Details of the gasifier are neither shown nor described herein since suitable gasifiers for use herein are well known in the art. One such suitable gasifier is shown and described in U.S. Pat. No. 3,811,849 (Woodmansee), which is incorporated herein by reference. Means illustrated by boost compressor 64 driven by motor M, are provided for pressurizing hot air and water vapor from any suitable source for supplying the pressurized air and water vapor to the gasifier, e.g., through inlet 66, as blast gas therefor. Ash produced in the gasification process may be removed through ash outlet line 71, employing means and methods therefor described in the referenced U.S. Pat. No. 3,811,849. The raw gaseous fuel produced in the gasifier is passed through any suitable gas clean-up system, e.g., system 70 wherein the raw gaseous fuel is contacted with water to remove at least a portion of any contaminants present in the fuel.

Conveniently, the present power plant may be operated employing sulfurous coal, which, however, results in contamination of the raw gaseous fuel with contaminants such as dust, tar, hydrogen sulfide, ammonia, and alkali-containing (e.g., sodium- and potassium-containing) condensate. Initially, the raw gaseous enters gas quench unit 116 wherein water or other aqueous liquid is sprayed through spray head 124 into contact with the gas. The raw gas entering the clean-up system may be at a temperature in the range from about 900° to about 1200° F. while the gas leaving the quench unit through line 128 will be cooled to a temperature of, for example, about 300°–400° F., e.g., 300° F.

The plant may be operated at any suitable gaseous fuel pressure, e.g., about 300 psia with a slight drop along the gas path. In the quench unit, the sprayed aqueous liquid may be at a temperature of, for example, about 330° F., resulting in condensation from the gas of condensible hydrocarbons including tar and volatile hydrocarbons. The resulting oily aqueous blowdown liquid 118 collected in the quench unit contains condensed volatile hydrocarbons and other contaminants removed from the raw gas. Water vapor contained in the gas (derived from unreacted steam and water, if any, contained in the coal) is subsequently condensed in cooler 144 and cooling unit 146.

The collected blowdown liquid, with or without additional blowdown liquid collected from subsequent operations in the clean-up system, is discharged from the system through line 74 as by means of pump P4. After subsequent clean-up or other processing of the raw gas, typically including reheating and resaturating as described, for example, in the aforementioned application of Kimura or as described in the above-referenced patent to Rudolph et al., clean, humid gas or otherwise cleaned-up gaseous fuel is supplied from the clean-up system through line 72, desirably including flow control valve V6, to the combustor 30.

In the prior art power plants referred to hereinabove the aqueous blowdown liquid from the gas clean-up system is passed directly or indirectly (i.e., after tar removal) to a water treatment unit without further use being made of such liquid in power generation. This results in considerable loss of water (as well as loss of the heat content thereof) and at the same time requires a substantial water treatment capacity. In addition, recovery of hydrocarbons in the water treatment unit is not entirely satisfactory from the standpoints of convenience, overall plant energy efficiency and cost.

Also, in such prior art power plants part of the pressurized discharge air from the gas turbine primary compressor is used as blast input to the gasifier via a boost compressor, after cooling and humidification of this air by contact with clean, substantially hydrocarbon-free water.

In contrast thereto, in the present invention heat and hydrocarbons are recovered from the aqueous blowdown liquid and power-generating use in also made of the liquid itself. Thus the defects of the prior system are substantially reduced by providing contact between such blowdown liquid and air (e.g., from the primary compressor) and then introducing the humidified air so produced into the gasifier via a boost compressor.

In accordance with the improvement of present invention, the integrated plant is provided with blast humidifier 36 operatively disposed for inlet of hot compressed air from any suitable source. In heretofore known manner, air (at any suitable temperature and pressure, e.g., 70° F. and 14.7 PSIA) is supplied through line 18 into, and by the suction action of, compressor 20 driven by rotating shaft 22. In turn, the shaft is driven by expansion of gases through gas turbine or expander 24 supplied through line or conduit 90 with a hot expansible gaseous product of the combustion carried out in combustor 30. Primary compressor 20 is preferably an adiabatic compressor, and accordingly the heat generated by pressurization of air therein effects increase in temperature of the air exhausted through discharge line 28. The discharged air (at a temperature, e.g., from about 500° to 800° F., usually about 560° F. and a pressure of, e.g., about 150 PSIA) is suitable for use in the combustor. Preferably, the flow of hot compressed air in line 28 is divided via branch lines 32 and 34 for supplying air to the combustor and (via the humidifier 36) to the boost compressor 64, respectively. Valves V1 and V2 may be employed in branch lines 32 and 34 respectively for controlling the corresponding rates of air flow as may be required.

Aqueous liquid discharged through line 74 from the gas clean-up system, after optionally being treated in tar system 76 as illustrated, is passed through line 82, pump P2, line 84, optionally through oily liquor blowdown heater 86, line 88, line 52 and finally into the blast humidifier through spray head 50 disposed in upper portion 48 thereof. Blowdown heater 86 may be included for supplying heat as from steam coil 87 shown therein as may be required to provide sufficient heat to the aqueous liquid sprayed into the humidifier to effect transfer (as vapor) of at least a portion of the water contained in the liquid and at least a portion of the volatile hydrocarbons contained therein. The steam coil 87 may be adapted (i.e., have such a heating capacity) to provide sufficient heat to substantially saturate the relatively dry air with water vapor. Transfer of the water and hydrocarbons is from the liquid into the hot relatively dry air which enters the humidifier via line 34. The resulting humid air stream (containing recovered hydrocarbons) is drawn through line 38 into an inlet of boost compressor 64, which further pressurizes the stream and supplies it to the gasifier.

Thus, in this invention the relatively dry air is humidified by taking up water (as water vapor) which otherwise typically would be passed to, and be a load on, the water treatment plant or unit 198. Advantageously, such unit, which is optionally included in the improved integrated plant, may be smaller in capacity than otherwise would be required if a portion of the water were not removed from the blowdown liquid.

Residual liquid from the humidification step is collected as body of liquid 42 in lower end 40 of the humidifier vessel. The upper level of the liquid body is preferably maintained above the air inlet communicating with line 34 thereby aiding in improved air-water contact. The humidifier may include vertically-spaced plates but preferably, as illustrated, it includes packing 46, which may be, for example, a bed of well-known Raschig rings, burl saddles, or the like. Air-water contact means, e.g., plates or packing, promotes intimate contact of the aqueous liquid with the air. Where packing is included in the humidifier, the aqueous liquid from the gas clean-up system is preferably treated with a tar removal system, e.g., tar system 76, upstream of the humidifier. Such treatment provides (for use in the humidifier) substantially tar-free aqueous liquid containing volatile hydrocarbons.

In heretofore known manner, an aqueous slurry including tar and dust is withdrawn from the tar system via line 78 and may be pumped by pump P3 through line 80 to extruder 14 to serve as a source of binder for the final coal.

Suitable operating conditions of the humidifier include, for example: (A) relatively dry air feed at 560° F., 150 PSIA, and containing 0.25 part by weight water vapor per one part by weight air (dry basis), (B) aqueous liquid feed at a temperature of 300° F. and containing volatile hydrocarbons, and (C) a liquid-to-air flow rate ratio of about 2 to 10 parts per minute liquid per part per minute of air depending on the vapor-liquid contact means employed. Under such operating conditions, it is desirable and often necessary to provide heat to at least one of the contact means (e.g., packing), the aqueous liquid, and the relatively dry air in an amount sufficient to effect the transfer of substantial amounts of both the volatile hydrocarbons and water to the air in order to provide the air with water vapor in an amount preselected for desired gasifier operation.

By way of further example, a gasifier requiring 0.25 part water per part air (by weight) in the blast gas and supplied with primary compressor discharge air at 550° F. and 150 PSIA would require a humidifier exit temperature of 271° F. Supplemental heat in the amount of about 125 Btu/lb dry air would be required to effect this humidification.

Gas entering the boost compressor should be sufficiently free of entrained droplets to prevent erosion of the compressor gas path. This can be effected by using droplet separators at the top of the humidifier and a heater to provide 10° to 20° F. superheat in the gas at the boost compressor inlet. The concentration of hydrocarbons in the blast gas should be kept below the flammability limit of the humidifier hydrocarbon-air mixture. Hydrocarbon concentration can be monitored by commercially available analyzers.

Although the aqueous liquid introduction means (e.g. a liquid inlet such as spray head 50) and air introduction means (e.g., an air inlet port defined by the connection of line 34 with the humidifier) may be so disposed on the blast humidifier as to provide substantially concurrent contacting flow of the air and liquid through the humidifier, the respective introduction means are preferably arranged as illustrated so that, in operation, the flow of liquid is generally counter-current to the flow of air through the packing of other vapor-liquid contact means.

In order to increase the amount of hydrocarbons and/or water transferred to the relatively dry air, liquid exit line 56 included for removal of liquid collected in the humidifier may be provided with conduit branch 58 communicating therewith the pump P1 for recycling any suitable portion of the removed liquid via line 52 through sprayhead 50. When such recycle means are employed, it is advantageous to further include means in the liquid body 42 for direct heating thereof. Such heating means is illustrated by steam coil 44 disposed in the liquid body. Check valve V5 may be provided in line 58 to insure that liquid flowing in line 88 does not reverse flow therethrough.

If desired, line 62 may included as a branch of the humidifier liquid removal piping. Liquid, if any, removed through line 62 and valve V3 provided therein can be recycled to the tar system or supplied to one or more other locations as desired. Residual aqueous liquid not recycled to the humidifier or otherwise directed is passed from the humidifier through line 60 preferably containing control valve V4, to the water treatment plant for such treatment, if any, as may be desired or required prior to discharge of the liquid as effluent to the environment.

Optionally, but preferably, the integrated coal gasification power plant of this invention further includes a steam turbine/electrical generator assembly wherein the heat content of the gas-turbine exhaust gas is utilized in generating the steam for driving the steam turbine. The assembly includes heat recovery steam generator 94 supplied with gas turbine exhaust gas via line 92 for generating steam in steam coils 96 supplied with principally liquid water passing through circulation conduit leg 98. The thus generated steam is passed through conduit 100 to drive steam turbine 102 in conventional manner whereby electrical generator 104 (having a common rotatable shaft 106) generates further electricity. Steam exhausted from the steam turbine is passed through conduit 108 to feed water heater 110 containing steam-operated heating coil 112 in heat exchange relationship with the circulating exhaust steam to continuously return at least partially liquid water through line 98 to the steam generator 94. The now cooled gas-turbine exhaust gas exits from the steam generator via discharge line 114. Where the steam turbine/electrical generator assembly is included, the efficiency thereof is increased by the additional heat of combustion derived from the hydrocarbons recovered in accordance with this invention.

Turning now to the preferred clean-up system 70, the quenched gas is passed from the quench unit 116 through line 128 to gas wash unit 130, wherein the gas is washed with a spray of aqueous liquid introduced through spray-head 138. The thus washed gas, typically at a reduced temperature of from about 250° to about 250° F. (e.g., 300° F.) is passed through line 142 into the tube-side header of a shell-and-tube head exchanger included in cooler 144. After the washed gas is passed in heat exchange relationship with lower-temperature liquid (supplied to the shell inlet side from reheater 168 by pump P7 drawing on liquid body 170 therein via pump dischrge line 147), the resulting further cooled gas, now at a temperature in the range of about 200° to 250° F. (e.g., 230° F.), is passed sequentially through line 150 into gas-cooling unit 154 and thereafter through line 160 into absorber 162, which constitutes a portion of sulphur removal unit 164. Liquid accumulated in the bottom of stripper 174 as liquid body 178 is pumped therefrom by way of pump P9 through conduit 182 into the top of the absorber and is sprayed by means of spray-head 184 onto absorber packing bed 186.

The resulting contact in the absorber of the upwardly flowing cool gas and the downwardly flowing cool liquid, which may be water, results in discharge from the absorber through line 166 of cool relatively dry gas as in the aforementioned heretofore proposed plant.

However, at this stage the gas leaving the absorber in the apparatus and process of this invention is found to be enriched with the hydrocarbons recovered in the blast humidifier 36 or other suitable transfer means included in the improved integrated plant 10. Warm liquid discharged from the cooler via line 148 and sprayhead 172 into reheater 168, which may be provided with any suitable vapor-liquid contact means (e.g., packing 174), reheats and rehumidifies the gas passing through the reheater to provide the clean, rich (i.e., enriched in hydrocarbons), humid gas which is passed to the combustor through supply line 172 optionally provided with flow control valve V6.

Turning now to the liquid flows employed in the illustrated gas clean-up system, condensate body 118 comprising a mixture of water, oil, tar and volatile hydrocarbons is drawn off sequentially through line 126 and line 74 to the suction side of pump P4 and concurrently through branch 120 feeding pump P5 for recirculation of the quenching liquid via line 122 to sprayhead 124. In like manner the body of liquid 132 formed in gas wash unit 130 is removed therefrom in part through line 140, which serves as a suction artery for pump P4. An additional part of liquid body 132 is removed through branch line 134 supplying pump P6 for recirculation of such portion of the liquid as may be desired through line 136 and spray-head 138, whereupon the gas passing through unit 130 is washed and further cooled as described above. A portion of the liquid drawn off from the wash unit 130 may be employed continuously or intermittently as may be required for gas quench unit liquid makeup. For this purpose line 196 containing control valve V7 and feeding pummp P11 is provided, with a discharge line of the latter pump communicating with the discharge line of pump P5 whereby these lines merge to form line 122. Condensate formed in cooler 144 and appearing as liquid body 146 is drawn therefrom by pump P11, the discharge line of which communicates through line 74 with the suction of pump P4. Similarly, liquid condensate forming in gas cooling unit 154 (the gas being cooled as by cooling water passed through coil 156) is drawn via line 158 and pump P10 to form a portion of the aqueous blowdown liquid being discharged from the gas cleanup system.

In the sulphur removal unit 164, stripper 174 thereof is supplied at its lower end through conduit 176 with live steam, which strips hydrogen sulfide ($H_2S$) and carbon dioxide ($CO_2$) from the liquid collected as body 188 in the absorber. The latter liquid is pumped by means of pump P8 through line 190 and sprayed through spray-head 192 onto the top of stripper packing 180. The gaseous stream leaving the stripper through line 194 includes as principal components thereof steam, $H_2S$, and $CO_2$. The latter stream may be passed to a Claus plant for conversion of the $H_2S$ to sulphur and recovery thereof. As briefly indicated above, liquid body 178 collected in the bottom of the stripper is pumped via pump P9, line 182 and sprayhead 184 into the absorber, wherein contact with gas passing therethrough is effected for absorption of, e.g., $H_2S$ and $CO_2$, prior to passing the gas to the reheater.

Although the above description has been given with reference to including air in the blast gas and introducing air into the combustor, it is understood that any suitable gaseous media containing free oxygen may be substituted for air, in whole or in part, in each application.

BEST MODE CONTEMPLATED

The best mode contemplated for carrying out this invention has been set forth in the description above, for example, by way of setting forth preferred means and operating conditions, including but not limited to preferred ranges and values of amounts, temperatures, pressures, flow rates, and other unobvious variables material to successfully practicing (including making and using) the invention in the best way contemplated at the time of executing this patent application.

It is to be understood that the foregoing detailed description is given merely by way of illustration and that numerous modifications may be made therein without departing from the spirt or scope of the present invention.

What is claimed is:

1. In an integrated coal gasification power plant comprising, in combination:
   (a) a coal gasifier for producing a raw gaseous fuel by pressure gasification of coal with pressurized air and water vapor;
   (b) means for pressurizing hot air and water vapor and for supplying the pressurized air and water vapor to said gasifier as blast gas therefor;
   (c) a gas clean-up system adapted to (I) remove from said raw gaseous fuel at least a portion of any contaminants present therein and (II) produce (i) an aqueous blowdown liquid containing volatile hydrocarbons and (ii) a cleaned-up gaseous fuel;
   (d) a combustor for combustion of said cleaned-up gaseous fuel to produce a hot expansible gaseous combustion product;
   (e) means for pressurizing air and for supplying the pressurized air to said combustor;
   (f) means for supplying said cleaned-up gaseous fuel to said combustor; and
   (g) means operable by the combustion product for generating electric power;
   the improvement comprising, in further combination with the above:
   (h) means for transferring as vapor, from said blowdown liquid into relatively dry air, both (I) at least a portion of the water contained in said aqueous liquid and (II) at least a portion of the volatile hydrocarbons contained in said liquid to provide at least a portion of the hot air and water vapor supplied to said pressurizing means set forth in (b) above, whereby said blast gas supplied to said gasifier comprises as components thereof both (III) recovered water and (IV) recovered volatile hydrocarbons, said recovered components having been recovered from said blowdown liquid.

2. The improvement of claim 1 wherein said transfer means includes means for contacting said relatively dry air with at least a portion of said aqueous liquid.

3. The improvement of claim 2 further including (i) means for providing heat to at least one of said contact means, said aqueous liquid and said relatively dry air in an amount sufficient to effect transfer of substantial amounts of both said volatile hydrocarbons and said water.

4. The improvement of claim 3 wherein said heat-providing means includes a steam coil having such a heating capacity to provide sufficient heat to substantially saturate said realtively dry air with water vapor.

5. The improvement of claim 2 wherein said contact means includes a vessel containing packing adapted to promote intimate contact of said aqueous liquid with said air and further including means for removing tar from said aqueous liquid at a location upstream of said contact means to provide a substantially tar-free aqueous liquid containing said volatile hydrocarbons.

6. The improvement of claim 5 wherein said vessel includes means for introducing said dry air and means for introducing said liquid with said introduction means disposed relatively each to the other such that in operation the flow of said liquid is generally countercurrent to the flow of said air through said packing.

7. The improvement of claim 6 wherein heating means are disposed in heat-exchange relationship with said aqueous liquid in a location upstream of said liquid introduction means.

8. The improvement of claim 7 wherein said contact means includes means for removing from said vessel aqueous liquid exiting from said packing and means for recycling at least a portion of the so-removed liquid to said liquid introduction means.

9. In a process for operating an integrated coal gasification power plant comprising, in combination, the steps of:
 (a) producing a raw gaseous fuel in a gasification zone by pressure gasification of coal with pressurized air and water vapor;
 (b) pressurizing hot air and water vapor and supplying the pressurized air and water vapor to said gasification zone as blast gas therefor;
 (c) removing from said raw gaseous fuel at least a portion of any contaminants present therein by cleaning up said raw fuel with water in such manner as to produce (i) an aqueous blowdown liquid containing volatile hydrocarbons and (ii) a cleaned-up gaseous fuel;
 (d) pressurizing air and supplying the pressurized air to a combustion zone;
 (e) effecting combustion of said cleaned-up gaseous fuel in said combustion zone to produce a hot expansible gaseous combustion product; and
 (f) employing the combustion product to generate electric power;
 the improvement comprising, in further combination with the above, the step of:
 (g) transferring as vapor, from said liquid into relatively dry air, both (I) at least a portion of the water contained in said aqueous liquid and (II) at least a portion of the volatile hydrocarbons contained in said liquid to provide at least a portion of the hot air and water vapor supplied to said pressurizing step set forth in (b) above, whereby said blast gas supplied to said gasifier comprises as components thereof both (III) recovered water and (IV) recovered volatile hydrocarbons, said recovered components having been recovered from said blowdown liquid.

10. The improvement of claim 9 wherein said transfer step includes the step of contacting said relatively dry air with at least a portion of said aqueous liquid.

11. The improvement of claim 10 further including the step of removing tar and dust from said aqueous liquid prior to effecting said contact step.

12. The improvement of claim 10 wherein water is transferred to said air by said contact step in an amount sufficient to saturate the air leaving the contact step.

* * * * *